United States Patent [19]
Bird et al.

[11] Patent Number: 5,483,263
[45] Date of Patent: Jan. 9, 1996

[54] ELECTRO-OPTIC DEVICE

[75] Inventors: Neil C. Bird, Horley; John M. Shannon, Whyteleaf, both of England

[73] Assignee: U.S. Philips Corporation, New York, N.Y.

[21] Appl. No.: 241,317

[22] Filed: May 11, 1994

[30] Foreign Application Priority Data

Jul. 5, 1993 [GB] United Kingdom ............... 9313841

[51] Int. Cl.$^6$ .................. G09G 3/20; G09G 3/36
[52] U.S. Cl. ................................... 345/207; 345/104
[58] Field of Search .................. 345/207, 98, 104, 345/182, 183, 205, 206, 4, 5; 365/215

[56] References Cited

U.S. PATENT DOCUMENTS

| | | | |
|---|---|---|---|
| 4,345,248 | 8/1982 | Togashi et al. | 345/207 |
| 4,382,187 | 5/1983 | Fraleux et al. | 250/578 |
| 4,945,242 | 7/1990 | Berger et al. | 250/367 |
| 4,952,031 | 8/1990 | Tsunoda et al. | 345/11 |
| 5,003,167 | 3/1991 | Arques | 250/208.1 |

FOREIGN PATENT DOCUMENTS

| | | |
|---|---|---|
| 0233104 | 8/1987 | European Pat. Off. . |
| 0488455 | 6/1992 | European Pat. Off. . |

*Primary Examiner*—Jeffery Brier
*Attorney, Agent, or Firm*—Michael J. Balconi-Lamica

[57] ABSTRACT

A first substrate (2) carries an electro-optic display (3) having a first array (4) of display elements (5) and conductors (12,13) for addressing individual display elements (5) to enable the display to display an image. A second substrate (6) carries a second array (7) of elements (8) addressable by conductors (9,10). Photosensitive elements (11) are associated with the conductors (9,10) for supplying, when illuminated, signals along the conductors (9,10) for accessing the elements (8) of the second array (7), the second substrate (6) being provided over the first substrate (2) so that the photosensitive elements (11) are associated with selected ones (5') of the display elements (5) for enabling the selected display elements (5a) to illuminate the photosensitive elements (11) allowing access of the elements (8) of the second array (7) to be controlled by the display (3) so that it is not necessary to provide separate drive circuitry for the second array.

16 Claims, 6 Drawing Sheets

ELECTRO-OPTIC DEVICE

BACKGROUND OF THE INVENTION

This invention relates to electro-optic devices and in particular to optically addressed electro-optic devices.

EP-A-488455 describes an electro-optic device which comprises a substrate carrying an addressable matrix device such as a liquid crystal display device or an image sensor. The rows and columns of the matrix array of display pixels or imaging elements are accessed by supplying signals along row and column conductors using an electro-optic switching arrangement which comprises photosensitive elements provided on the substrate carrying the matrix array. In the arrangement described in EP-A-488455, the photosensitive elements are driven by a linear array of light emitting devices such as light emitting diodes or the like. Each row (or column) conductor is associated with a unique pattern of photosensitive elements with each photosensitive element being located at the intersection of the row (or column) with a column (or row) conductor so that by activating a given set of the linear light emitting devices a given set of column (or row) conductors and the associated photosensitive elements are illuminated causing the photosensitive elements to conduct. Each unique pattern of illumination of the linear light emitting devices corresponds to a unique arrangement of photosensitive elements and accordingly when a selected given set of light emitting devices is activated all of the photosensitive elements associated with a unique row (or column) conductor will conduct so coupling that row (or column) conductor to the associated drive circuitry. Such an arrangement enables a reduction in the number of components and allows there to be comparatively few external connections to the electro-optic device.

SUMMARY OF THE INVENTION

According to the present invention, there is provided an electro-optic device comprising a first substrate carrying an electro-optic display having a first array of display elements and conductors for addressing individual display elements to enable the display to display an image, a second substrate carrying a second array of elements addressable by conductors and photosensitive elements associated with the conductors for supplying, when illuminated, signals along the conductors for accessing the elements of the second array, the second substrate being provided opposite the first substrate so that the photosensitive elements are associated with selected ones of the display elements for enabling the selected display elements to illuminate the photosensitive elements allowing access of the elements of the second array to be controlled by the display.

Thus, in an electro-optic device in accordance with the invention an electro-optic display for displaying images to a user of the device is used to enable elements carried by a second substrate to be optically addressed so that it is not necessary to provide separate drive circuitry for the element array carried by the second substrate so allowing for a reduction in the drive circuitry required and thus simplifying and reducing the costs of the manufacture of the electro-optic device, especially of the second array.

As used herein the term electro-optic display means any device capable of producing a spatial pattern of light which is controlled electrically, for example a liquid crystal display (LCD) or other similar display or a cathode ray tube (CRT) especially a flat CRT.

The electro-optic display may comprise a two-dimensional matrix array of display elements arranged in row and columns with associated row and column conductors and the second array may be a two-dimensional array of elements arranged in rows and columns with row and column conductors being associated with the elements of the second array so that supplying signals to a selected row conductor and a selected column conductor of the second array accesses an element of the second array and the row and column conductors of the second array being associated with photosensitive elements for supplying, when illuminated by selected ones of the display elements, signals along the row and column conductors for accessing the elements of the second array. However, the present invention could be applied to a situation in which at least one of and possibly both the display and the second array is a one dimensional array.

Generally, the photosensitive elements are arranged at the periphery of the second array so facilitating their protection against undesired illumination from sources other than the display and reducing any disturbances of the normal functioning of the second array which might otherwise arise.

Each conductor of the second array may be associated with a respective photosensitive element.

In an alternative arrangement, each conductor of the second array may be associated with a number of photosensitive elements arranged such that signals are only supplied along the conductor when all of the associated photosensitive elements are illuminated. For example an appropriately modified version of the arrangement described is EP-A-488455 could be used.

The photosensitive elements associated with adjacent conductors may be staggered so that the spacing between the photosensitive elements associated with adjacent conductors is greater than the spacing between adjacent conductors. This should reduce any possibility of optical cross-talk between adjacent photosensitive elements, that is it should reduce the possibility of accidental illumination of photosensitive elements adjacent the photosensitive element intended to be illuminated.

In one example each element of the second array is arranged to store charge and each row conductor of the second array is coupled to a select voltage supply line via at least one respective photosensitive element so that in operation of the electro-optic device in order to read charge stored at the element within a row the at least one photosensitive element associated with the row is illuminated by the display to couple the select voltage to the row conductor. Each row conductor of the second array may be coupled to a reset voltage supply line via at least one respective switching element for enabling a reset voltage pulse to be applied to the row conductor to reset the associated elements.

Each column conductor of the second array may be connected by at least one first photosensitive element to one electrode of a respective column capacitor having its other electrode coupled to a charge sensitive amplifier and to at least one second photosensitive element which is coupled to a voltage reference line so that, in order to read charge from an element within a given column of the second array, first the associated at least one first photosensitive element is illuminated by the display for allowing the charge stored at an element in both the column and a row to which the select voltage is applied to be transferred via the column conductor and the at least one first photosensitive element to the capacitor and then the at least one second photosensitive element is illuminated to allow the charge stored at the column capacitor to be transferred to the charge sensitive amplifier.

In another example, each column conductor may be coupled to one electrode of each of first and second column capacitors by respective first photosensitive elements with each capacitor having its other electrode coupled to a respective charge sensitive amplifier and to a respective second photosensitive element coupled to a voltage reference line so that, in order to read charge from an element within a given column of the second array, first one of the associated first photosensitive elements is illuminated by the display for allowing the charge stored at an element in both the column and a row to which the select voltage is applied to be transferred via the column conductor and the said one first photosensitive element to the associated one of the first and second capacitors and then the one of the second photosensitive elements is illuminated to allow the charge stored at the column capacitor to be transferred to the charge sensitive amplifier.

The spacing between the photosensitive elements associated with adjacent conductors may be greater than the spacing between the adjacent conductors so as to reduce the possibility of cross-talk. The first and second arrays may be of comparable size and the display elements for illuminating the photosensitive diodes may be provided at the periphery of the first array so avoiding or at least reducing any disturbance in the normal function of the first array. The display may comprise a liquid crystal display.

The second array may comprise an array of further photosensitive elements so that the second array forms an image sensor provided on top of the display enabling, for example, the optical input of data into the display. As possible alternatives, the second array could comprise a further display which can be used to modulate the display output of the display carried by the first substrate. Additionally the second array could be any suitable form of electro-optically programmable memory, for example, a thin film memory. The second substrate carrying the second array may be mounted to the first substrate carrying the first array. The second substrate carrying the second array may be separable from the first substrate carrying the first array.

The present invention also provides an electro-optically addressable component comprising a substrate carrying an array of elements addressable by conductors and photosensitive elements associated with the conductors for supplying, when illuminated, signals along the conductors for accessing the elements of the second array for use in a device according to the first aspect of the invention. This may be particularly advantageous where the display is used to program data into the second array as it enables the second array carrying the data to be transported and allows the information stored therein to be read by another machine. Such a second array could be used for example as a programmable security card or for example for electro-optically storing data such as audio signals to be read by another machine and connected into an audio output.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENT

It should of course be understood that the drawings are merely schematic and are not to scale. Like parts are referred to throughout the drawings by like reference numerals.

Figure 1:
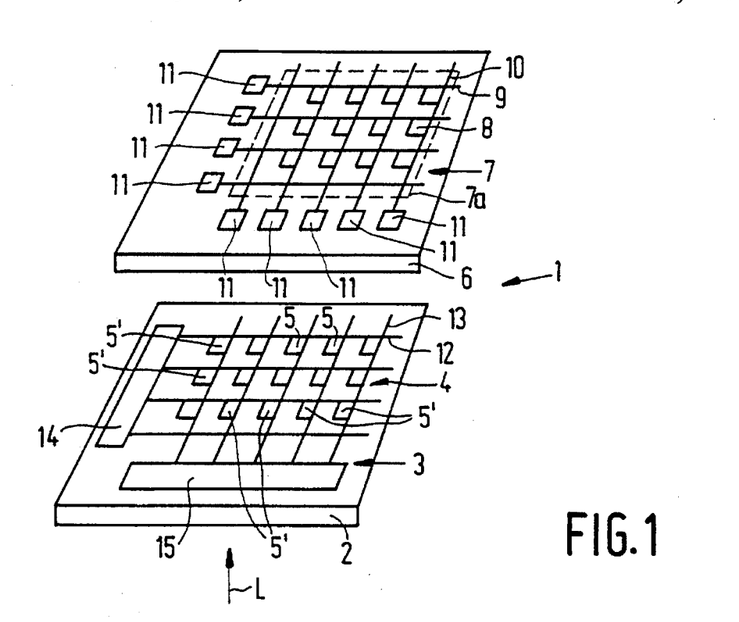
FIG. 1 shows a simplified schematic perspective view of an electro-optic device in accordance with the invention.

Referring now to the drawings an electro-optic device 1 is shown which comprises, as illustrated very schematically in FIG. 1, a first substrate 2 carrying an electro-optic display 3 having a first array 4 of display elements 5 and conductors 12,13 for addressing individual display elements 5 to enable the display to display an image, a second substrate 6 carrying a second array 7 of element 8 addressable by conductors 9,10 and photosensitive elements 11 associated with the conductors 9,10 for supplying, when illuminated, signals along the conductors 9,10 for accessing the elements 8 of the second array 7, the second substrate 6 being provided opposite (as shown over or on top of) the first substrate 2 so that the photosensitive elements 11 are associated with selected ones 5' of the display elements 5 for enabling the selected display elements 5a to illuminate the photosensitive elements 11 allowing access of the elements 8 of the second array 7 to be controlled by the display 3.

The fact that the second array 7 can thus be accessed or driven by the display 3 means that it is not necessary to provide separate drive circuitry for the second array.

Figure 2:
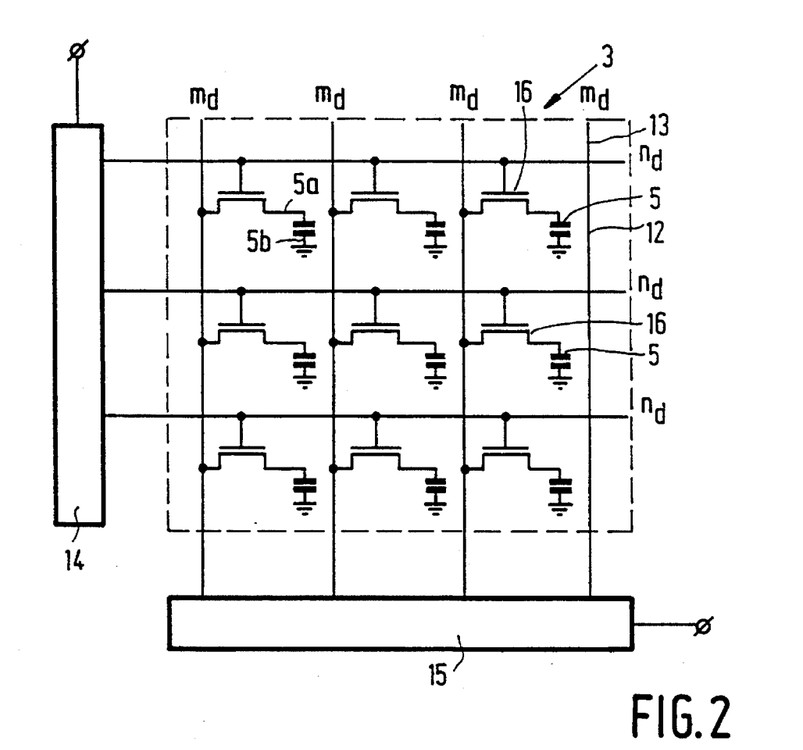
FIG. 2 shows one example of a circuit layout for the display of an electro-optic device in accordance with the invention.
Figure 3:
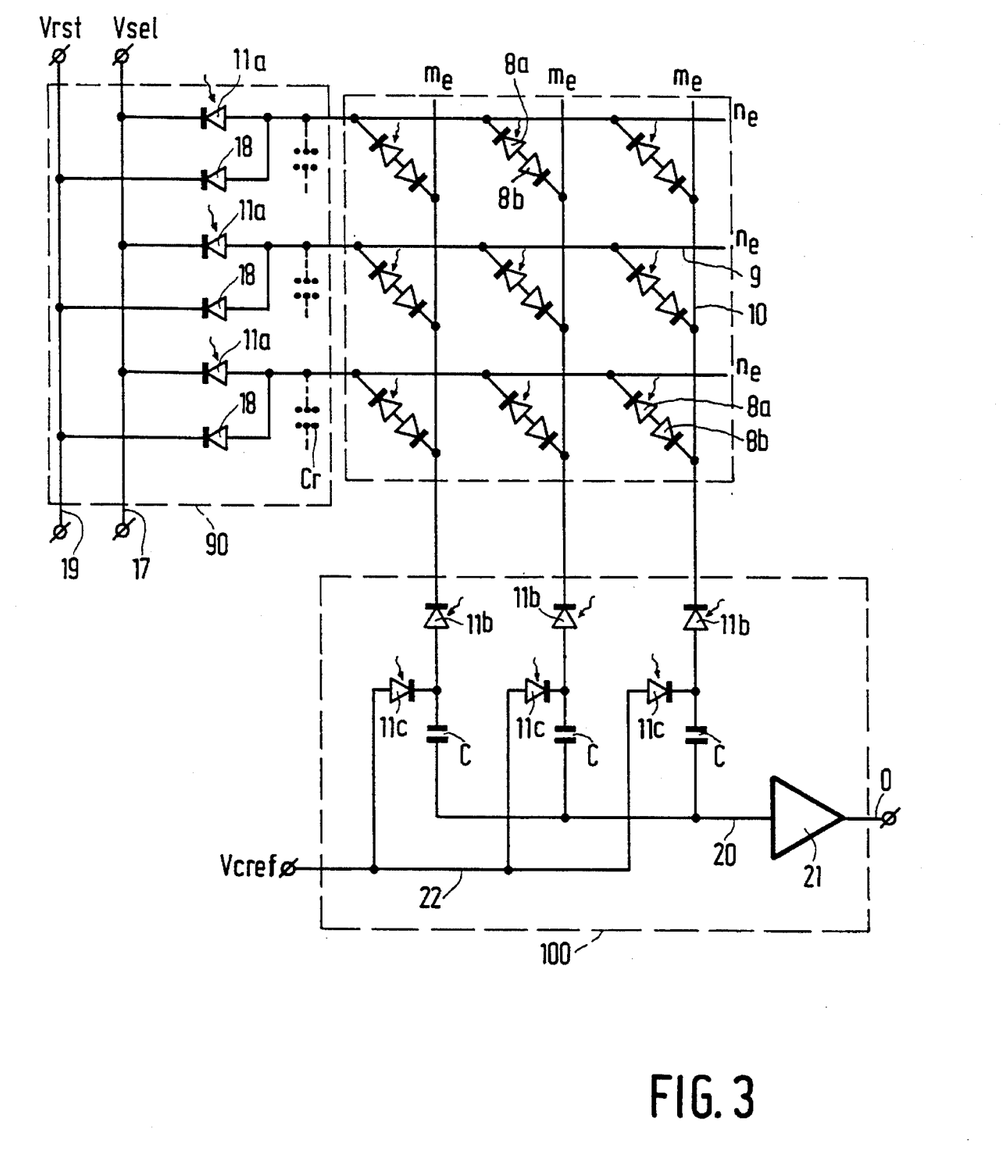
FIG. 3 shows one example of a circuit layout for the second array of an electro-optic device in accordance with the invention.

In the examples illustrated in the drawings and as shown most clearly in FIGS. 2 and 3, respectively, the electro-optic display 3 comprises a two-dimensional matrix array 4 of display elements 5 arranged in rows $n_d$ and columns $m_d$. The second array 7 is similarly a two-dimensional array of elements 8 arranged in rows and columns $n_e$ and $m_e$. In the interests of clarity the elements 5 and 8 are illustrated merely as blocks in FIG. 1.

The electro-optic display 3 may be of any suitable conventional type but is in this example a liquid crystal display formed on a suitable transparent substrate, for example a glass or plastics substrate 2. The display elements 5 are connected in rows $n_d$ and columns $m_d$ by row and column conductors 12 and 13 to which signals are supplied for accessing or driving individual display elements or pixels 5 by appropriate row and column decoder/driver circuitry 14 and 15.

FIG. 2 illustrates a schematic circuit layout for one example of a liquid crystal display 3 suitable for use in an electro-optic device in accordance with the invention.

In the example illustrated in FIG. 2 each display element 5 is associated with a respective switching device 16. The switching devices 16 may be of any suitable form (for example non-linear resistive elements such as metal-insulator-metal or p-i-n thin film diodes) but are in the example shown provided as thin film transistors (TFTs).

Each TFT 16 has its gate electrode coupled to the associated row conductor 12. One of the main (source and drain) electrodes of each TFT 16 is coupled to the associated column conductor 13 and the other to one electrode 5a of the associated display element 5. Although not shown in FIGS. 1 or 2, twisted nematic liquid crystal material is sandwiched in known manner between the substrate 2 and a transparent, generally ITO, common electrode 5b of the display element 5 carried by a further transparent substrate. For the sake of simplicity and in accordance with normal practice the display elements 5 are shown in FIG. 2 as capacitors. The first substrate 2 and the further transparent substrate (not shown) are generally provided in known manner externally with polariser layers and internally with alignment layers.

In operation of the display 3, light entering the first substrate 2, generally light from a simple uniform light source L, is modulated according to the light transmission characteristics of the display or picture elements 5 with, of course, the light transmission characteristics of each picture element 5 being controlled by the voltage signals applied to the associated row and column conductors 12 and 13 by the row and column decoder and drive circuitry 14 and 15. The circuitry 14 and 15 may be of any suitable conventional form, for example as described in EP-A-488455 (to which reference may be made for further details) and will not be discussed in detail here. Generally, the display 3 will be driven on a row at a time basis by scanning the row conductors 12 sequentially with a gating signal so as to turn on each row of TFTs 16 in turn and applying data (video) signals corresponding, for example, to a TV line or similar to the column conductors 13 for each row of picture elements 5 in turn as appropriate and in synchronism with the gating signal so as to build up a complete display picture or image.

As illustrated in FIG. 1, the second array 7 carried by the second substrate 6 is provided opposite, as shown over, the display 3 so that the photosensitive elements 11 on the second substrate 6 can receive light from selected ones of the display elements 5. In this example, the photosensitive elements 11 are provided around the periphery 7a (shown in dashed lines) of the second array 7 and are associated with corresponding peripheral picture elements 5' of the display 3 with, in this example, each photosensitive element 11 being associated with one particular peripheral display element 5'. Of course, other arrangements for the location of the photosensitive elements 11 and the corresponding picture elements 5' may be possible. Providing the photosensitive elements 11 and corresponding picture elements 5' around the peripheries of their respective arrays 4 and 7 has however advantages in that there should be no interference with the normal operation of the display 3 and the second array 7. In addition such an arrangement should make it relatively simple to shield the photosensitive elements 11 from extraneous light.

In the example illustrated in FIG. 1, the second array 7 is shown simply as a two dimensional matrix array 7 of rows $n_e$ and columns $m_e$ of rectangular blocks representing the elements 8 with each row $n_e$ of elements 8 being associated with a respective row conductor 9 and each column $m_e$ being associated with a respective column conductor 10 so that, as in the case of the display 3, each element 8 is accessible by a unique pair of row and column conductors 9 and 10.

The elements 8 may be any type of element which can be electro-optically controlled. For example, the elements 8 could be memory elements such as thin film transistors which store charge representing logical '1's and '0's according to the voltages applied to the row and column conductors 9 and 10 so that the second array 7 forms a E$^2$PROM (electrically erasable programmable ROM) type memory of a type, for example, similar to that described in our pending UK Patent Application No. 9217743.5 filed on 19th Aug., 1992. Any suitable form of data could be stored in such a memory array and the second substrate 6, with a suitable battery power source if necessary, may be readily transported to other locations and could for example form a so-called smart card which may carry security data to enable access to buildings etc. and/or data such as image or audio data which can be displayed or output as video or audio signals by suitable equipment upon insertion of the card.

In another example, the elements 8 could be elements whose optical properties may be altered either solely electrically by voltage signals input to the row and column conductors 9 and 10 or by a combination of the voltage signals input to the row and column conductors 9 and 10 and light incident on the elements 8. Such an array 7 could be optically readable and could again carry security, video and/or audio data.

Where it is desirable for the second array 7 to be transported in a 'programmed' state as discussed above, then some means, for example mechanical shutters of the type commonly used on computer discs and the like, should be provided on the second array 7 in a manner such that the photosensitive elements 11 are only exposed to light when the second array 7 is in position over the first array or display 3.

In another example the second array 7 may comprise an image sensor consisting of a two-dimensional array of photosensitive elements again accessed by the row and column conductors 9 and 10. Any suitable form of photosensitive elements may be used, for example photosensitive thin film transistors, or photosensitive non-linear resistive elements such as Schottky diodes, thin film diodes, or photosensitive p-i-n diodes.

FIG. 3 illustrates one possible circuit layout for the second array 7 where the elements 8 comprise photosensitive p-i-n diodes.

In the example illustrated in FIG. 3, each element 8 is coupled between a unique pair of row and column conductors 9 and 10 and comprises a photosensitive p-i-n diode 8a in series with a switching diode 8b so that the anodes of the two diodes 8a and 8b are coupled together. The switching diodes 8b will generally be of similar construction, although possibly of smaller area, to the photosensitive diodes 8a but will of course be shielded from any incident light. Of course, other arrangements are possible. Thus, for example the switching elements may be three terminal devices such as thin film transistors (TFTs) as described in, for example, U.S. Pat. No. 4,382,187 or each photosensitive diode 8a may form both the photosensitive element and the switching element and may simply be provided in series with a charge storage capacitor as shown in, for example, EP-A-233104 and U.S. Pat. No. 4,945,242.

In the example illustrated in FIG. 3, each row conductor 9 is coupled via a respective photosensitive diode 11a to a voltage supply line 17 connected to a positive potential $V_{sel}$ and via a respective switching diode 18 to a voltage supply line 19 connected to a potential $V_{rst}$. This forms the row drive circuitry 90. Each column conductor 10 is coupled via a respective photosensitive diode 11b, a capacitor C and a connection line 20 to a charge sensitive amplifier 21 of any known suitable form and via the photosensitive diode 11b and a respective further photosensitive diode 11c to a reference potential $V_{cref}$ supply line 22 to provide the column read-out circuitry 100. The photosensitive diodes 11 are of course oriented so as to be in a blocking condition until illuminated as will be explained below.

Such an image sensor array 7 may be permanently or movably mounted to the display 3 and may be used, for example, to enable data to be input to the display using a light pen or the like so enabling a user to enter information or alter the image shown on the display 3 by 'writing' on the surface of the electro-optic device 1. Although where the elements 8 of the second array 7 comprise photosensitive diodes it would be very difficult to make the second array 7 transportable separately of the first array while retaining the image stored at the second array and shielding the second array 7 from ambient light, forming the device so that the image sensor array 7 is removably mounted to the display 3 enables the image sensor array 7 to be removed when not in use to allow for better viewing of the display 3 and also allows the same image sensor array 7 to be used with several different displays 3.

The voltages $V_{sel}$, $V_{rst}$ and $V_{cref}$ may be supplied by an appropriate voltage source which could be an appropriate battery together with suitable voltage reference providing means located on or attached to the second substrate 6. Where, the second substrate 6 is permanently fixed to the display 3, then the voltage supply necessary for the second array 7 could be provided from the power supply used for the display 3.

Depending upon the particular application of the electro-optic display 1, it may be desirable for the second array 7 to be as transparent as possible so that viewing of the display 3 is not unduly obscured by the second array 7. This is especially the case where the second array 7 comprises an image sensor array which may be used to 'write' upon the display 3. The amount of area of the image array 7 which is transparent may be optimised by using transparent materials where possible, for example by using indium tin oxide to form the plates of any capacitors, and by careful positioning of those components such as the photosensitive and switching diodes 8a and 8b in the example given above which by virtue of their operation or construction cannot be transparent. Generally, to provide the required degree of electrical conductivity, it is necessary to form the row and column conductors 9 and 10 of opaque conductive material for example chromium or chromium followed by aluminium. In such a case, at least the photosensitive diodes 8a and 8b may be formed on top of the row conductors 9.

The photosensitive elements 11 may have a construction similar to that of the photosensitive diodes 8a. The photosensitive elements 11 need of course to be shielded from light directly incident on the second array 7. Where the photosensitive elements 11 are provided around the periphery of the array 7 then this may be achieved quite simply by a suitable opaque frame surrounding the array 7. Such a frame may simply be provided by the final housing of the electro-optic device 1 without the need for any additional components.

The photosensitive elements 11 may receive light directly from the selected ones 5' of the display 3 in which case the lower electrode of the photosensitive elements 11 should of course be formed of a transparent material such as indium tin oxide or at least provided with an aperture for the passage of light. As a possible alternative, the photosensitive elements 11 may receive light indirectly from the selected display elements 5' by providing a reflective layer over the photosensitive elements 11 to reflect light passing through tile substrate 2 from the selected display elements 5' back down onto the photosensitive elements 11. Such a reflector could of course also serve to shield the photosensitive elements 11 from light which is directly incident on the second array 7.

The photosensitive and switching diodes 8a and 8b could of course simply be formed one on top of another on the row conductors 9 with of course the photosensitive diodes 8a at the top in a manner similar to that described in U.S. Pat. No. 5,003,167.

FIGS. 4 to 8 illustrate by way of a schematic plan view and cross-sectional views one possible example of a layout for the image sensor array 7 shown in FIG. 3.

As illustrated, the second array is formed using thin film technology on the substrate 6. The substrate 6 is in this case transparent and is formed of any suitable glass or plastics material. Indeed where the image sensor array 7 is permanently provided on the display 3 then the substrate 6 could also provide the top glass plate of a conventional LCD display.

A first electrically conductive layer, generally a chromium layer, is deposited onto the substrate 6 and patterned to define the row conductors 9, the cathode electrodes 23 of the switching diodes 8b, the voltage supply line 17 (which also forms the cathode electrodes of the photosensitive elements 11a) and the cathode electrodes 24 of the switching diodes 18. The first metal layer also provides the cathode electrodes 25 and 26 of the photosensitive elements 11b and 11a and the line 20 which also forms the lower plates of the capacitors C.

The various diodes 8a,8b,11a,11b,11c and 18 are then formed by depositing and patterning appropriately doped semiconductor layers. In this example, the diodes are all amorphous silicon n-i-p diodes formed by in sequence n conductivity, intrinsic and p conductivity type amorphous silicon layers.

Figure 5:
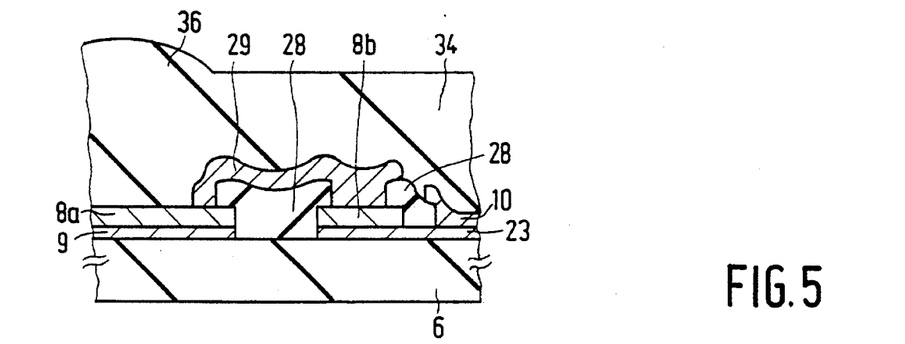
FIG. 5 is a cross-sectional view taken along the line V—V in FIG. 4.
Figure 8:
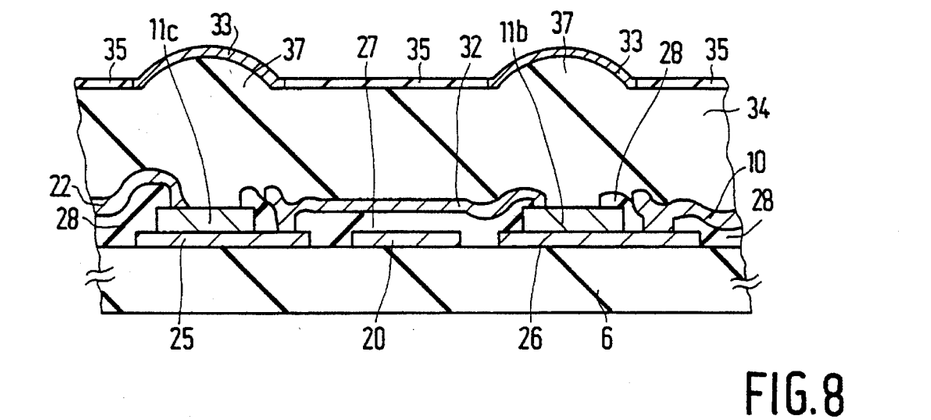
FIG. 8 is a cross-sectional view taken along the line VIII—VIII in FIG. 4.

An insulating layer, generally silicon nitride or some other suitable, in this case, transparent insulator, is then deposited and defined to leave regions 27 forming the dielectric regions of the capacitors C and necessary insulation regions 28 defining contact windows to enable a second subsequent metal layer, again generally a chromium (possibly covered by an aluminium) layer to be deposited and patterned to define the column conductors 10 contacting, as shown in FIGS. 5 and 8, the electrodes 23 and 26, first connection electrodes 29 each connecting the anodes of the associated photosensitive and switching diodes 8a and 8b with, of course, the first connection electrodes 29 arranged as shown in FIG. 5 to shield the switching diodes 8b from any light incident on the second array 7 but to allow light to pass to the photosensitive diodes 8a.

As is known in the art, the photosensitive diodes 8a (and for ease of manufacture the switching diodes 8b) may have a transparent top layer of indium tin oxide which protects the diode structure during patterning of the insulator and second metal layers.

The second metal layer defines second connection electrodes 30 providing electrical connection between the row conductors 9 and the associated anodes of the photosensitive diodes 11a and third connection electrodes 31 each connecting the associated row conductor 9 to the associated switching diode 18. The third connection electrodes 31 also act to shield the switching diodes 18 from incident light. The second metal layer also provides the voltage supply line 19 and its connections to the cathode electrodes 24 of the switching diodes 18 and the connection line 22. Fourth connection electrodes 32 each forming the other plate of the associated capacitor and connecting together the anodes of the associated photosensitive diodes 11b and 11c may also be formed of the second metal layer but could if desired, and at the expense of an increased resistance, be formed of a transparent conductive material such as indium tin oxide.

Figure 4:
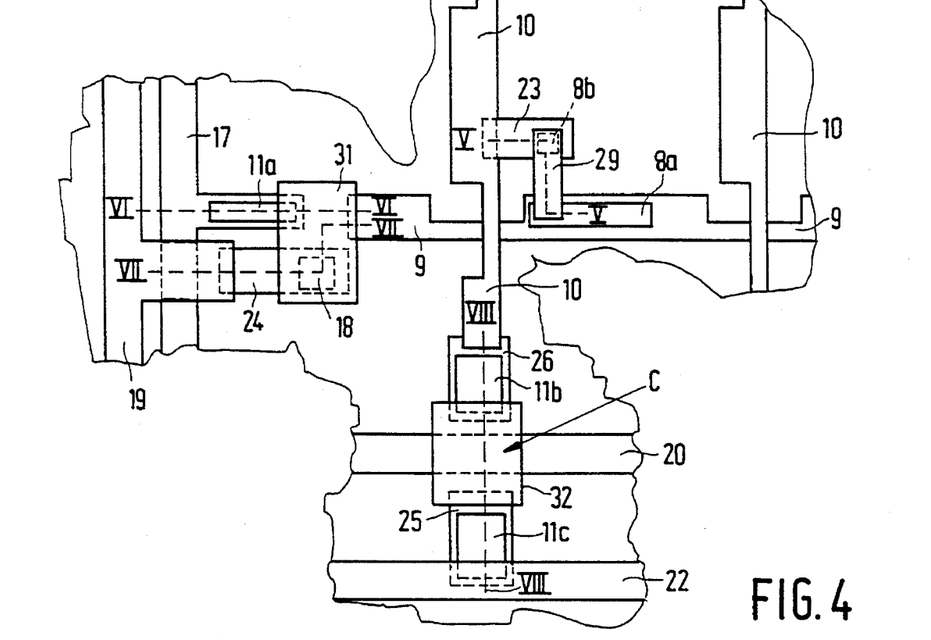
FIG. 4 is a schematic fragmentary plan layout showing an example of one possible layout for the second array of an electro-optic device in accordance with the invention.
Figure 6:
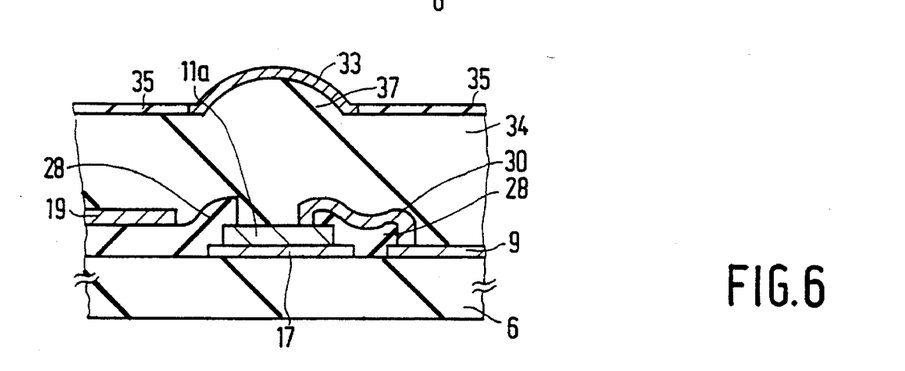
FIG. 6 is a cross-sectional view taken along the line VI—VI in FIG. 4.
Figure 7:
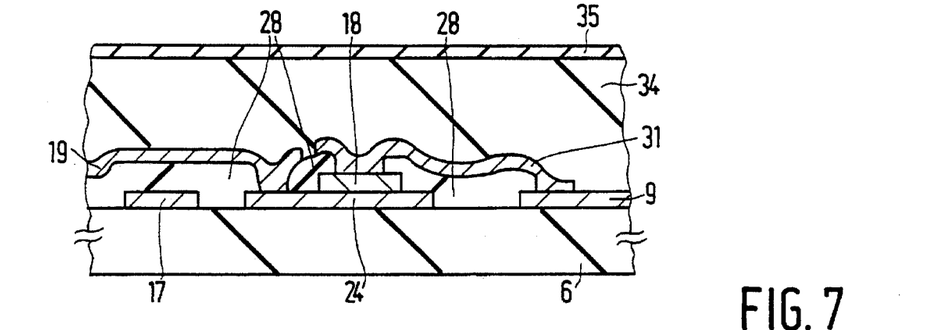
FIG. 7 is a cross-sectional view taken along the line VII—VII in FIG. 4.

As can be seen from FIGS. 4, 6 and 8, the layout of the electro-optic device 1 is organised so that there are transparent areas arranged mainly by the insulating regions 27,28 and any transparent electrodes which enable light from the selected ones 5' of the display elements to pass through the second array 7 and be reflected by a reflective layer. This reflective layer may form part of the housing (not shown) of the second array 7 or the combined electro-optic device 1 or could be, as shown, a reflective layer provided as discrete regions 33 on top of a transparent, for example polyimide, passivating layer 34 provided over the peripheral region 7a of the second array 7. The free surface of the passivating layer 34 may be covered in the region of the periphery 7a of the second array 7 between the reflective regions 33 by a light absorbing layer 35 so as to avoid undesired reflections onto the photosensitive elements 11a,11b,11c. As shown in FIGS. 5,6 and 8, the passivating layer 34 (or a subsequent layer) may be shaped to define a microlens array in a manner described in, for example, EP-A-154962 with the lens elements in the peripheral region only being covered by deposited reflective material so that the microlens elements 36 over the main part of the second array 7 each serve to concentrate incident light onto the photosensitive elements 8a while the reflectively coated microlens elements 37 serve to reflect and concentrate light from the display transmitted through the substrate 6 onto the photosensitive elements 11a, 11b, 11c.

As one possible alternative to the use of the reflective regions 33, the electrodes 17, 25 and 26 could as mentioned above be formed either with apertures or of a transparent material such as indium tin oxide so enabling light from the selected ones 5' of the display elements 5 to be directly incident on the photosensitive elements 11a, 11b, 11c. As will be appreciated by those skilled in the art where the photosensitive elements 11a, 11b, 11c are illuminated from beneath, it may be desirable to alter the order of growth of the semiconductor layer so that p-i-n rather than n-i-p diodes are formed. This would of course also require some alteration of the first and second metal layer patterns to define the appropriate interconnections.

Figure 9:
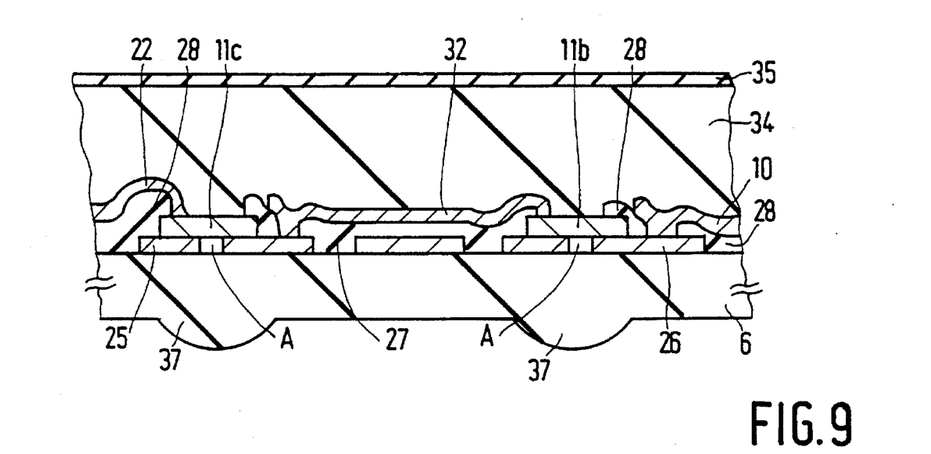
FIG. 9 is a cross-sectional view similar to FIG. 8 of a modified version of the second array shown in FIG. 4.

FIG. 9 illustrates, by way of a cross-sectional view similar to FIG. 8, a modified form of the second array in which, as mentioned above, the photosensitive elements 11a, 11b, 11c are provided with lower electrodes 25,26 formed with apertures A so that the photosensitive elements 11a, 11b, 11c are sensitive to light incident on the substrate 6 and passing through the apertures A. As shown in FIG. 6, the substrate 6 (or a layer provided on the substrate 6) may be formed with a microlens array so that a respective lens element 37 is arranged to concentrate light onto an associated photosensitive element 11a, 11b or 11c via the respective aperture A. In this case the passivating layer 34 is covered by a light absorbing layer 35 in the region of the peripheral photosensitive elements 11a, 11b, 11c.

There may also be circumstances, if it is desired to manipulate or combine images, where it is desirable for the photosensitive elements 8a of the second array to react to light incident on them from the display 5 instead of or in addition to reacting to light incident on them from above in which case the appropriate regions of the row conductors 9 may be formed with apertures or of a transparent material or a reflective system such as described above for the peripheral photosensitive diodes 11a, 11b and 11c could be used.

It will of course be appreciated that, although FIG. 3 shows the photosensitive and switching diodes 8a and 8b as having their anodes coupled the diodes could be reversed so as to have their cathodes connected. In addition, the switching diode 8b rather then the photosensitive diode 8a could be connected directly to the associated row conductor 9. It will of course be understood by those skilled in the art that either of these modifications may of course require appropriate changes in the polarities of the voltages applied to the second array 7.

The operation of an electro-optic device 11 having as the second array 7 an image sensor with the circuit layout shown in FIG. 3 will now be described with the help of FIG. 10.

As in a conventional image sensor, the second array 7 is read out by selecting each row in turn.

In the example illustrated in FIG. 3, each row conductor 9 is, as described above, connected to a photosensitive diode 11a and a switching diode 18 with the photosensitive diodes 11a being connected to the voltage supply line 17 and the switching diodes 18 being connected to the voltage supply line 19.

Immediately before a given row is read out the selected picture elements 5' are controlled by the display row and column drive circuitry 14 and 15 so as not to illuminate the photosensitive diodes 11a. The voltage $V_{rst}$ on the voltage supply line 19 is then pulsed negative as indicated by the line a in FIG. 10 so turning on all the switching diodes 18 so that the voltage of each row conductor 5 falls as indicated by the solid line in FIG. 10 to $V_{unsel}$. When the voltage $V_{rst}$ on the line 19 again goes high after the pulse the row conductors 5 are held (as indicated by the dashed line b in FIG. 10) at the $V_{unsel}$ voltage by virtue of the row capacitance shown schematically in FIG. 3 by the capacitors $C_r$ shown in dashed lines. The row capacitance could be simply that of the diodes and cross-overs on the row or may be an additional component provided at the periphery 7a of the second array 7.

The required row $n_e$ is then selected by using the row and column drive circuitry 14 and 15 of the display 5 to cause the appropriate ones of the peripheral display elements 5' to transmit light to illuminate the peripheral photosensitive diode 11a associated with the required row. The photo current generated within the illuminated peripheral photosensitive diode 11a charges the row capacitance $C_r$ and raises the row voltage (as indicated by line in FIG. 10) close to $V_{sel}$ which selects the row. The voltage $V_{sel}$ turns on the switching diodes 8b in each of the elements 8a in the selected row and a current flows through the element or pixel 8, charging the intrinsic capacitance of the photosensitive diode 8b to a known value. The amount of charge required is equal to the amount of charge generated by light incident on the photosensitive diode 8a.

This charge is detected by the column read-out circuitry 100 in the following manner.

Thus, when the required row is selected as discussed above, the appropriate ones of the peripheral display elements 5' of the display 5 are controlled so as to transient light to illuminate the photosensitive diodes 11b as well as the photosensitive diode 11a of the selected row. The photosensitive diodes 11c are not illuminated at this time. The current flowing through each element 8 of the selected row flows down the associated column conductor 10 to the column capacitor C until the element or pixel 8 has been recharged to its starting point as indicated by the point x in FIG. 10. The row is then de-selected by the application of the next voltage reset pulse $V_{rst}$ via the switching diodes 18 and the appropriate ones of the peripheral display elements 5' are controlled so that the photosensitive diodes 11a and diodes 11b are no longer illuminated.

At this stage, the column capacitors C will have been charged by the associated photosensitive diodes 11b.

The appropriate ones of the peripheral display elements 5' of the display are then controlled so as to illuminate the photosensitive elements 11c one by one in sequence. When the photosensitive diode 11c associated with a particular column conductor C is connected to a reference potential $V_{ref}$ and a current then flows from the charge-sensitive amplifier 21 to discharge the column capacitor C. This places the packet of charge from the element or pixel photosensitive diode 8a onto the feedback capacitor (not shown) of the charge-sensitive amplifier 21. The amplifier output voltage can then be sampled and subsequently processed using conventional means.

Each row of the second array 7 is sequentially addressed in the same manner. When a row is not being read out the switching diodes 8b are not rendered conducting and so photogenerated charge is stored on the intrinsic capacitance of the photosensitive diodes 8a of the row. The period when this is happening is known as the integration period because effectively the charge stored at a photosensitive element 8a during this period represents an integral over the time the row is unselected of light incident on the photosensitive element 8a.

In a video type of sensor, the process of reading the rows will be carried out continously, that is the first row is read again after the last row and so on so that for N rows and a read-out time per row of $t_R$ the integration period is $t_2 = N \cdot t_R$.

Where the image sensor is being used, for example, to scan a document then generally only a single read of the second array 2 will be required so that in that case the integration time would be the time since the light source illuminating the document was turned on. Where the image sensor array 7 is sufficiently transparent then the main display elements 5 of the display 3 may be used to illuminate a document placed over the image sensor array 7 so enabling the document to be in intimate contact with the second array 7.

Figure 11:
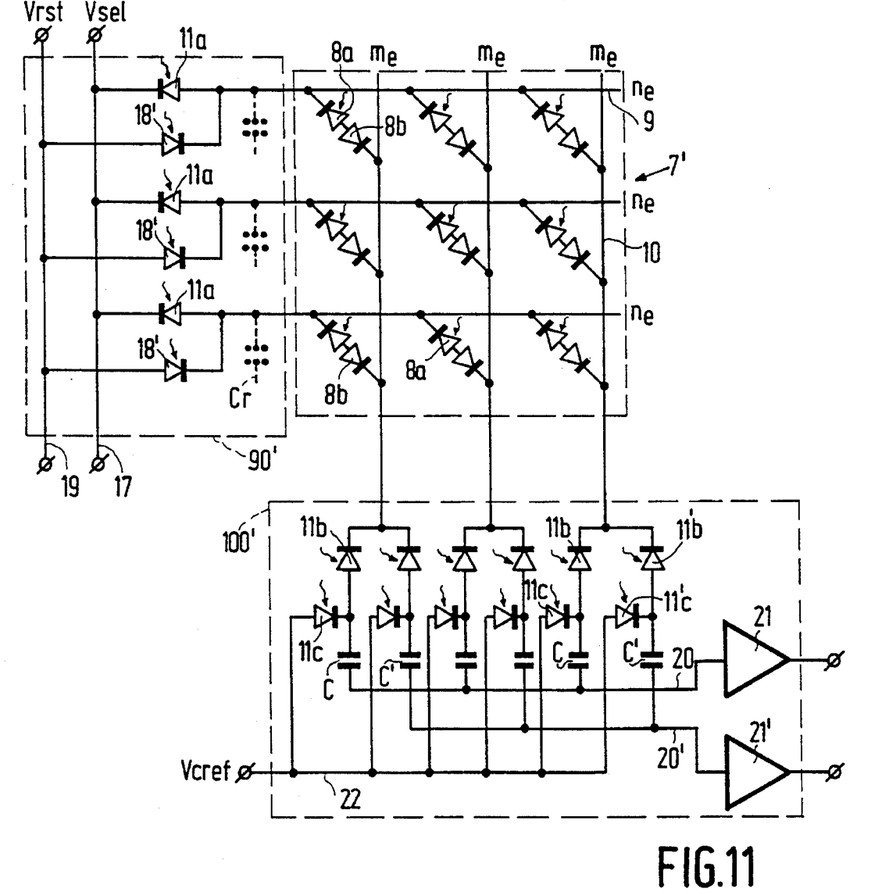
FIG. 11 shows a modified version of the circuit layout shown in FIG. 3.

FIG. 11 illustrates a modified version of the circuit layout shown in FIG. 3. As will be evident from a comparison of FIGS. 3 and 11, the two differ in the construction of the row read-out circuitry 90' and the column read-out circuitry 100'.

As shown in FIG. 11, the switching diodes 18' are reversed in comparison to the switching diodes 18 shown in FIG. 3 (that is the diodes 18' have their anodes connected to the supply line 19). The diodes 18' are also photosensitive, that is they have a similar structure to the diodes 11a. In this arrangement, the reset pulse $V_{rst}$ can be applied to the row conductors 9 by illuminating the photosensitive diodes 18' appropriately. This arrangement has the advantage that the supply lines 17 and 18 need only supply constant (that is not pulsed) voltages and so these voltages may be provided by a suitable battery which can be mounted to the substrate 6.

As a further alternative, it may be possible to replace each pair of switching and photosensitive diode 18 and 11a by a single photosensitive diode (because the forward current of a diode is much higher than the photocurrent) and to enable resetting by applying a different voltage to the single voltage supply line.

In a second array 7' having the modified circuit layout shown in FIG. 11, each column conductor 10 is associated with two photosensitive diodes 11b and 11'b, two photosensitive diodes 11c and 11'c and two column capacitors C and C'. All of the photosensitive diodes 11c and 11'c have their anodes coupled to the voltage reference line 22. The capacitors C are coupled via the connection line 20 to a charge sensitive amplifier 21 and the capacitors C1 coupled via a connection line 20' to a charge sensitive amplifier 21'.

In operation of an image sensor array 7 having the circuit layout shown in FIG. 11, while the appropriate ones of the peripheral display elements 5' are illuminating the photosensitive elements 11a associated with the n+1 th row and the photosensitive elements 11'b to enable the charge accumulated by the elements 8 of the n+1 th row to be transferred to the column capacitors C', the photosensitive elements 11c are illuminated one by one in sequence by the appropriate ones of the peripheral display elements 5' so as to discharge the column capacitors C as discussed above with reference to FIG. 3 to transfer the charge to the feedback capacitor of the charge sensitive amplifier. Thus, while the first stage of the row read-out operation is being carried out in respect of one row (the n+1 th in this example), the second stage can be carried out in respect of the preceding row (the nth row) so reducing the overall time required to read-out all rows of the second array 7 by about one half.

Figure 10:
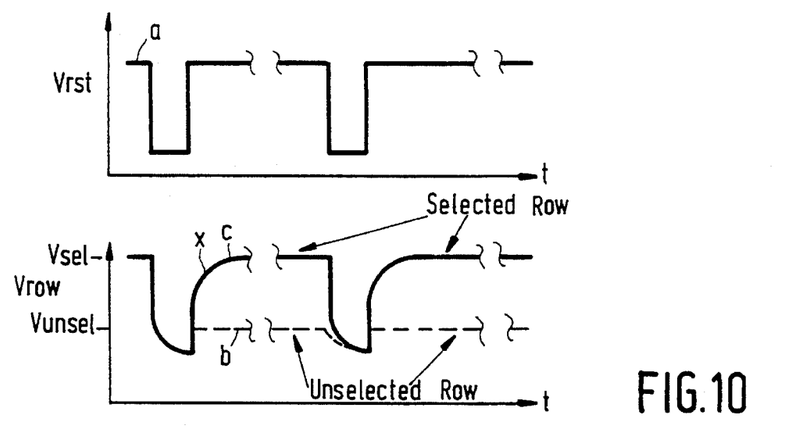
FIG. 10 shows graphically the changes in voltages applied to a row conductor with time t for explaining operation of a device in accordance with the invention.

Although in the examples described above, all of the column conductors 10 of the second array 7 are coupled to a single charge sensitive amplifier 21 in the case of FIG. 3 and two in the case of the FIG. 11 arrangement, the number of charge sensitive amplifiers 21 could be increased so that a given number m/y (where m is the number of columns and y the number of charge sensitive amplifiers 21 in the FIG. 3 arrangement or the number of pairs of charge sensitive amplifiers 21 and 21' in the FIG. 10 arrangement) up to a maximum where y=m, so enabling y columns to be read-out simultaneously and thus reducing the total read-out time for the second array 7 by a factor y.

Although the photosensitive diodes 11a, 11b and 11c and switching diodes 18 have been shown in the Figures as being of similar structure to the photosensitive and switching diodes 8a and 8b, they may be of different geometry, for example of larger area, so as to provide the current handling capability required and they could if considered desirable be p-i-n as opposed to n-i-p diodes, for example. Of course, the modified row read-out circuitry 90' or the modified column read-out circuitry 100' shown in FIG. 11 could be used in the example shown in FIG. 3.

It is of course important that the photosensitive elements 11a, 11b, 11c are sufficiently well spaced from adjacent similar photosensitive elements 11a, 11b, 11c that there is no significant cross-talk between the photosensitive elements 11a, 11b, 11c. Depending upon the relative pitches of the display array 4 and the second array 7 and the separation of the second array 7 from the first or display array 4, there may be no problems presented by providing the photosensitive elements 11a, 11b, 11c at a pitch similar to the row and column conductors 9 and 10. However, in order to reduce the possibilities of any such cross-talk the photosensitive elements 11a, 11b and 11c may be staggered as shown in the schematic plan view in FIG. 12 in a direction along the length of the associated row or column conductors 9 or 10 so as effectively to increase the spacing between adjacent photosensitive elements 11a, 11b, 11c.

In the example illustrated in FIG. 11, the photosensitive elements 11a are staggered so that in a direction along the row conductors 9, the n, n+3, etc. photosensitive elements 11a are aligned, that is so that each fourth element 11a is aligned. The spacing of the adjacent photosensitive elements 11a will of course depend upon the design rules of the device and any constraints on the overall size of the device. Any suitable staggered pattern may however be adopted.

The photosensitive diodes 11b and 11c may be similarly staggered with, of course, the photosensitive diodes 11b and 11c associated with a respective column conductor being themselves spaced apart along the direction of the column conductor 10.

Generally all of the photosensitive elements 11a, 11b, 11c will be spaced by a similar distance from the associated display element 5' and so may have a similar spacing from one another. Normally the lateral spacing of the display elements 5' should be greater than the vertical separation between each display element 5' and the associated photosensitive element 11a, 11b, 11c.

Figure 12:
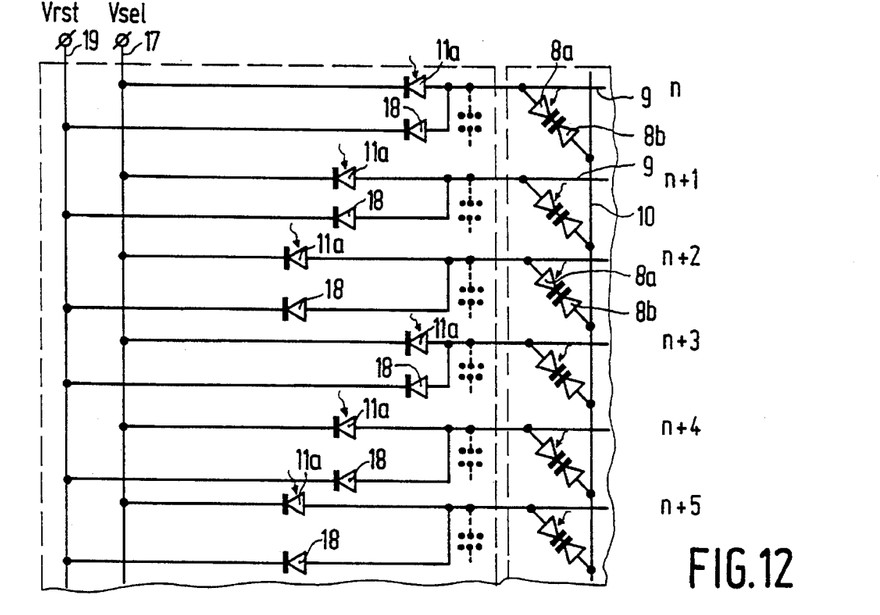
FIG. 12 is a schematic plan view of part of the circuit layout of the second array of an electro-optic device in accordance with the invention for illustrating one example of an arrangement for the photosensitive elements.
Figure 13:
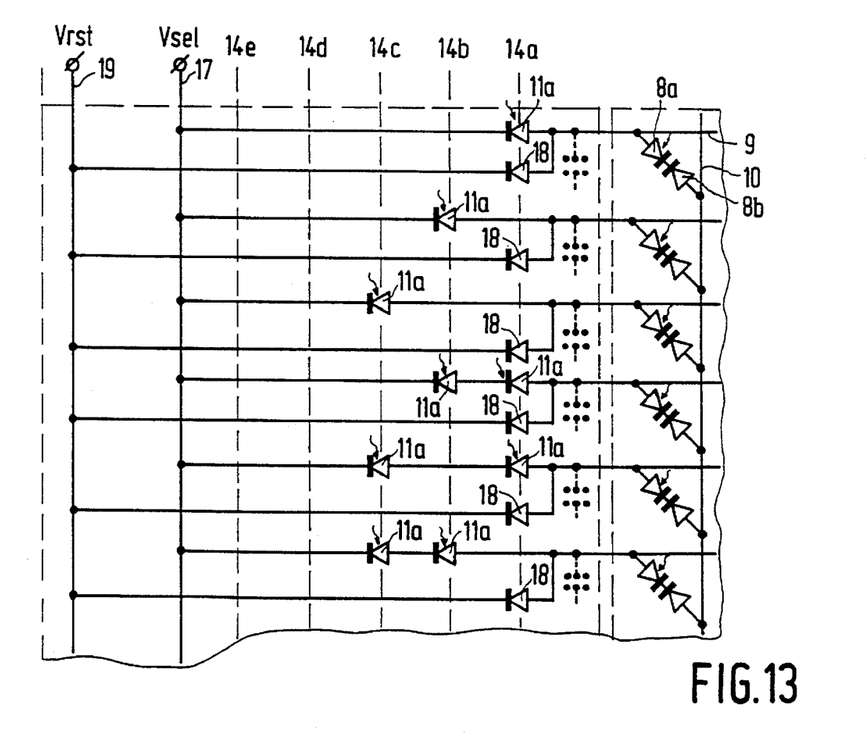
FIG. 13 is a schematic plan view of part of the circuit layout of the second array of an electro-optic device in accordance with the invention for illustrating another example of an arrangement for the photosensitive elements.

In the examples described above, each row and each column conductor 9 and 10 is coupled via a single photosensitive element 11a, 11b, 11c to the associated voltage supply or connection line 17,20 and 22. However this need not necessarily be the case and, for example, an arrangement similar to that described in EP-A-488455 could be used in which, for example, each row conductor 9 is associated with one or more photosensitive elements 11a each aligned with a respective different column of periperal display elements 5' so that the row conductor 9 is only connected to the voltage supply line 17 when all of the associated photosensitive diodes 11a are rendered conducting. An example of such a pattern of photosensitive elements 11a is illustrated schematically in the diagram in FIG. 13. In FIGS. 12 and 13 the dashed lines numbered 14a to 14e represent columns of peripheral display elements 5' of the display 5.

In such an arrangement cross-talk between photosensitive diodes 11a associated with adjacent row conductors 9 does not present significant problems because, of course, each row conductor 9 will only be coupled to the voltage supply line $V_{sel}$ if all of the associated photosensitive elements 11a are rendered conducting.

A similar structure could be used for the photosensitive diodes 11b, 11c associated with the column conductors 10 where appropriate, for example where it is required to switch individual photosensitive diodes.

EP-A-488455 describes the use of transistor, generally TFT buffers, to provide higher currents for charging the row capacitance and a similar idea could be used in the present device to increase the row select current.

Where, as discussed above, it is desirable for the second array 7 to be sufficiently transparent to enable the display 3 to be viewed through the second array 7 then the image sensor transparency could be increased in a manner similar to that described, in our copending UK Patent Application No. 9209734.4 filed on 6th May 1992 which describes structures in which the number of row and column conductors in the second array 7 can be decreased by associating a number of photosensitive elements 8a with the same pair of row and column conductors 9 and 10 and providing some form of threshold adjustment means so that different voltage levels are required to assess different ones of the photosensitive elements 8a associated with the same pair of row and column conductors 9 and 10.

The second array 7 could be any suitable type of array for example an array of electro-optically adjustable memory elements or photosensitive elements as discussed above or touch sensitive elements. In addition the second array 7 could be another display controllable by the display 3 to allow superposition of images. Although this may present parallax problems it could be of advantage where an image is derived from a conventional analogue TV or video signal. Also, although in the examples described above the display array 4 and the second array 7 are both two dimensional active matrix arrays, this need not necessarily be the case and one or other of the arrays 4 and 7 may be one dimensional and/or a passive array.

From reading the present disclosure, other modifications and variations will be apparent to persons skilled in the art. Such modifications and variations may involve other features which are already known in the semiconductor art and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. An electro-optic device comprising a first substrate carrying an electro-optic display having a first array of display elements and conductors for addressing display elements to enable the display to display an image, a second substrate carrying a second array of elements addressable by conductors and photosensitive elements associated with the conductors for supplying, when illuminated, signals along the conductors for accessing the elements of the second array, the second substrate being provided opposite the first substrate so that the photosensitive elements are associated with selected ones of the display elements for enabling the selected display elements to illuminate the photosensitive elements allowing access of the elements of the second array to be controlled by the display.

2. An electro-optic device according to claim 1, wherein the electro-optic display comprises a two-dimensional matrix array of display elements arranged in row and columns with associated row and column conductors and the second array is a two-dimensional array of elements arranged in rows and columns with row and column conductors being associated with the elements of the second array so that supplying signals to a selected row conductor and a selected column conductor of the second array accesses an element of the second array and wherein the row and column conductors of the second array are associated with photosensitive elements for supplying, when illuminated by selected ones of the display elements, signals along the row and column conductors for accessing the elements of the second array.

3. An electro-optic device according to claim 2, wherein each element of the second array is arranged to store charge and each row conductor of the second array is coupled to a select voltage supply line via at least one respective photosensitive element so that in operation of the electro-optic device in order to read charge stored at the element within a row the at least one photosensitive element associated with the row is illuminated by the display to couple the select voltage to the row conductor.

4. An electro-optic device according to claim 3, wherein each row conductor of the second array is coupled to a reset voltage supply line via a respective switching element for enabling a reset voltage pulse to be applied to the row conductor to reset the associated elements.

5. An electro-optic device according to claim 3, wherein each column conductor of the second array is connected by at least one first photosensitive element to one electrode of a respective column capacitor having its other electrode coupled to a charge sensitive amplifier and to at least one second photosensitive element which is coupled to a voltage reference line so that, in order to read charge from an element within a given column of the second array, first the associated at least one first photosensitive element is illuminated by the display for allowing the charge stored at an element in both the column and a row to which the select voltage is applied to be transferred via the column conductor and the at least one first photosensitive element to the capacitor and then the at least one second photosensitive element is illuminated to allow the charge stored at the column capacitor to be transferred to the charge sensitive amplifier.

6. An electro-optic device according to claim 3, wherein each column conductor is coupled to one electrode of each of first and second column capacitors by respective first photosensitive elements with each capacitor having its other electrode coupled to a respective charge sensitive amplifier and to a respective second photosensitive element coupled to a voltage reference line so that, in order to read charge from an element within a given column of the second array, first one of the associated first photosensitive elements is illuminated by the display for allowing the charge stored at an element in both the column and a row to which the select voltage is applied to be transferred via the column conductor and the said one first photosensitive element to the associated one of the first and second capacitors and then the one of the second photosensitive elements is illuminated to allow the charge stored at the column capacitor to be transferred to the charge sensitive amplifier.

7. An electro-optic device according to claim 1, wherein the photosensitive elements are arranged at the periphery of the second array.

8. An electro-optic device according to claim 1, wherein each conductor of the second array is associated with at least one respective photosensitive element.

9. An electro-optic device according to claim 1, wherein each conductor of the second array is associated with a number of photosensitive elements arranged such that signals are only supplied along the conductor when all of the associated photosensitive elements are illuminated.

10. An electro-optic device according to claim 1, wherein the photosensitive elements associated with adjacent conductors are staggered so that the spacing between the photosensitive elements associated with adjacent conductors is greater than the spacing between the adjacent conductors.

11. An electro-optic device according to claim 1, wherein the first and second arrays are of comparable size and the display elements for illuminating the photosensitive diodes are provided at the periphery of the first array.

12. An electro-optic device according to claim 1, wherein the display comprises a liquid crystal display.

13. An electro-optic device according to claim 1, wherein the second array comprises an array of further photosensitive elements.

14. An electro-optic device according to claim 1, wherein the second substrate carrying the second array is mounted to the first substrate carrying the first array.

15. An electro-optic device according to claim 1, wherein the second substrate carrying the second array is separable from the first substrate carrying the first array.

16. An electro-optically addressable component comprising a substrate carrying an array of elements addressable by conductors and photosensitive elements associated with the conductors for supplying, when illuminated, signals along the conductors for accessing the elements of the second array for use in a device according to claim 1.

* * * * *